United States Patent

Spahn

[15] 3,684,006
[45] Aug. 15, 1972

[54] PISTON CHECK VALVE

[72] Inventor: Walter Spahn, c/o Messer Griesheim GmbH, Frankfurt/Main, Germany

[22] Filed: June 1, 1970

[21] Appl. No.: 42,276

[30] Foreign Application Priority Data

June 3, 1969    Germany..........P 19 28 180.2

[52] U.S. Cl. ............................................... 165/97
[51] Int. Cl. ............................................. F28f 27/02
[58] Field of Search..........................165/5, 95, 97

[56] References Cited

UNITED STATES PATENTS 2,734,565    2/1956    Lochman.....................165/97

*Primary Examiner*—Charles Sukalo
*Attorney*—Connolly and Hutz

[57] ABSTRACT

A check valve includes a valve housing having a valve cover, a valve seat and spring loaded valve diaphragm with a valve spindle, and base for the valve spindle. The free end of the spindle is made in the form of a piston and the valve spindle cover is in the form of a cylinder through which a blast of control gas enters.

4 Claims, 4 Drawing Figures

PISTON CHECK VALVE

BACKGROUND OF INVENTION

The invention concerns a check valve which is particularly adapted for incorporation in installations for low temperature technics, for example, the separation of air components (air reduction). In such equipment reversible plate heat exchangers or regenerators are used, at the cold end of which a check valve is inserted which connects the ports of the heat exchanger or the regenerator with the input and output pipes. With each reversal one half of the check valve is closed and the other half opened.

Such check valves consist in principle of a valve housing with a valve cover and valve seat upon which a spring loaded valve diaphragm rests. On opening of the valve, the force of the flowing medium must exceed the resistance of the spring compressing it thereby raising the valve diaphragm from its seat. When the pressure of the flowing medium is still too small, the spring is only partially compressed and the entire cross-sectional area of the valve is not opened. In this case there is great pressure loss, especially when an oversized valve is employed.

SUMMARY OF INVENTION

An object of this invention is to solve the above problem by construcing a check valve, which, independent of pressure or volume of the flowing medium always opens to the total cross-sectional area of the valve.

A check valve has been found, which consists of a valve housing, a valve cover, a valve seat and a spring loaded valve diaphragm with a valve spindle and a housing for the spindle. According to the invention, the free end of the valve spindle is formed into a piston and the valve spindle housing in this region is constructed as a cylinder; the piston is impelled by a sudden puff or burst of controlling gas through an opening in the valve cover.

Especially advantageous is the incorporation of a check valve constructed according to this invention at the cold end of a reversible plate heat exchanger or regenerator when the flowing medium is under different high pressures. In this case the flowing medium itself can be used as the controlling gas. The check valves according to the invention are simple in construction and sure in function. Also in very small volume flow they open to the maximum cross-sectional area with certainty.

THE DRAWINGS

Figure 3:
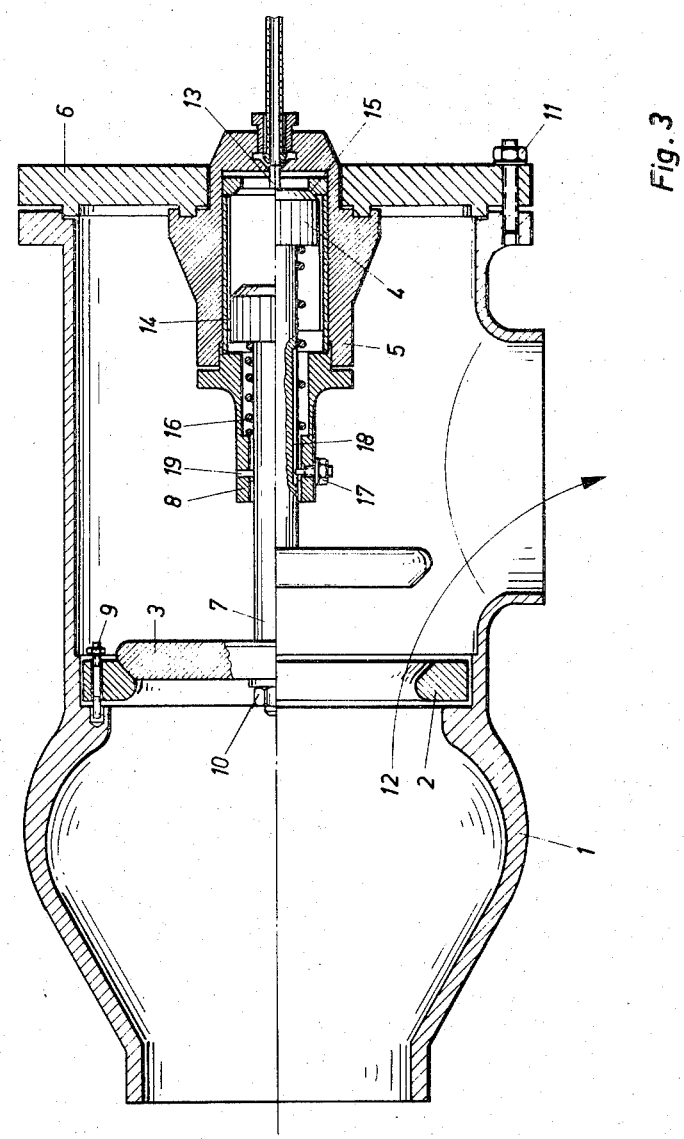
Figure 4:
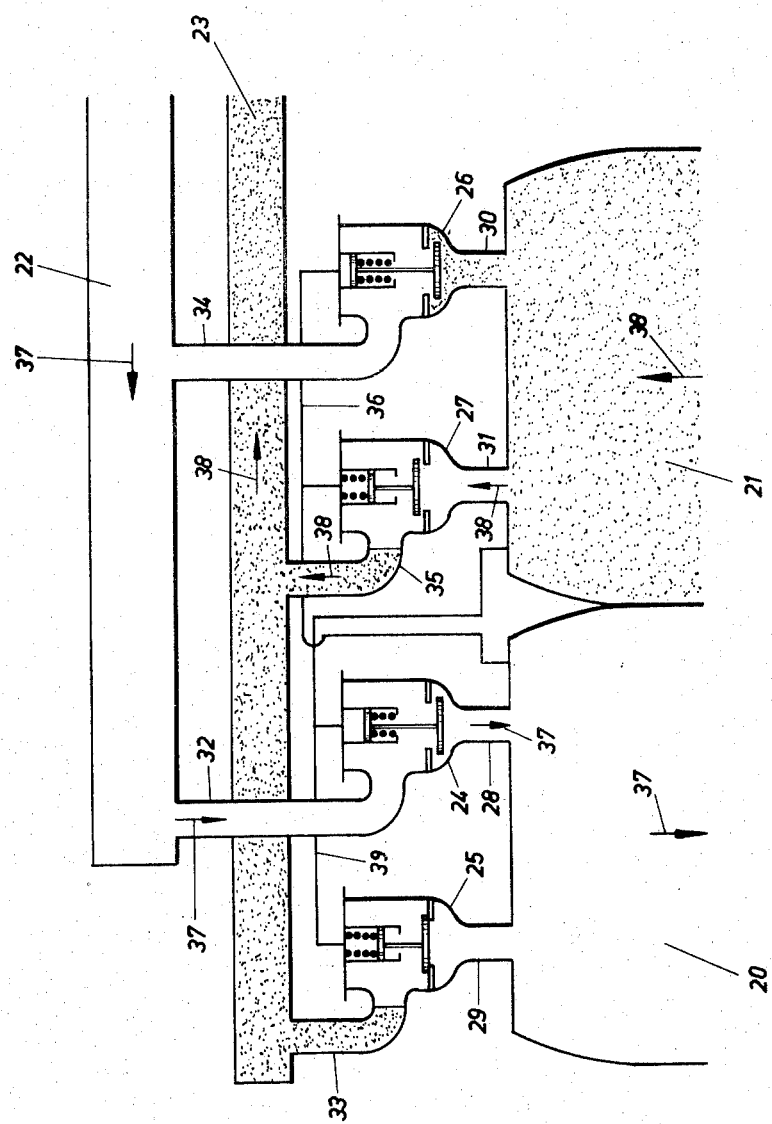

FIG. 3. is a cross-sectional view of still another embodiment of this invention; and FIG. 4 is a schematic showing of an arrangement incorporating a check valve, constructed according to this invention, at the cold end of a reversible plate heat exchanger or regenerator of an air reduction installation.

DETAILED DESCRIPTION

Figure 1:
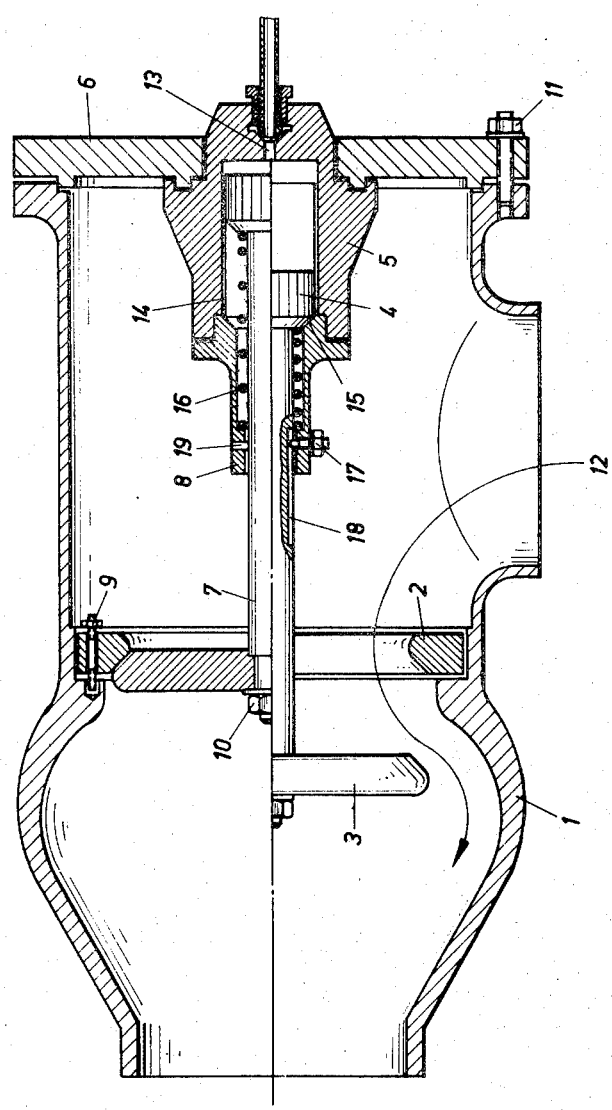
FIG. 1 is a cross-sectional view of one embodiment of this invention.
Figure 2:
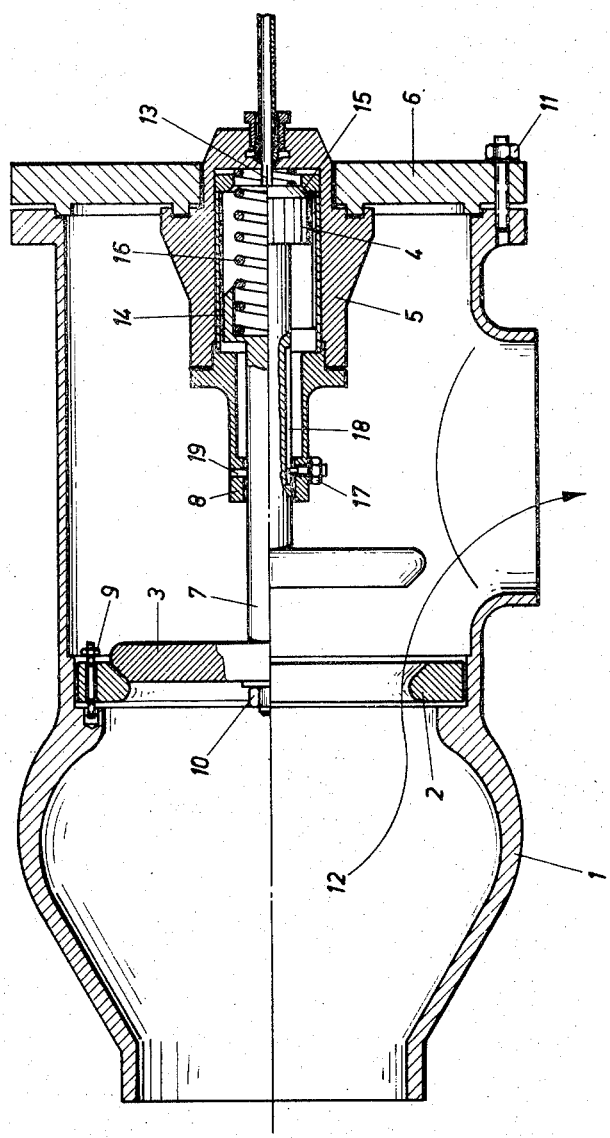
FIG. 2 is a cross-sectional view of a further embodiment of this invention.

In the embodiment according to FIGS. 1–3 like parts with the same function have like reference numerals.

The check valve according to FIG. 1 consists essentially of the valve housing 1 with the valve seat 2 and the valve cover 6, as well as valve diaphragm 3 with the valve spindle 7. The valve spindle 7 is enclosed in the valve spindle housing 8 which is rigidly jointed to the valve cover 6. The jointure can be made with bolts or screws, as valve seat 2 is fastened with bolt 9, the valve diaphragm with screw 10, and the valve cover with screw 11. The position of the valve diaphragm 3 is shown open and also closed. The direction of medium is indicated by means of an arrow 12. The check valve is pictured as an angle valve, because this short form is often advantageous. It is apparent that the invention is not limited to this form of construction.

According to this invention the free end of the valve spindle 7 is formed as the piston 4 and the corresponding place of the valve spindle housing 8 is constructed as cylinder 5. Piston 4 and cylinder 5 are hit with a controlling stream of gas through a control opening 13 in the valve cover. Because small losses due to leaks are permissible the piston moves in the dry cylinder 14 and is furnished with a thick seat 15 at the end. Piston rings are therefore not necessary. A spring 16, concentrically situated on the valve spindle 7 between the base 8 of the valve spindle and the piston so that the check valve, when not being driven by the controlling gas, is in the closed position. To open the valve a controlling gas is needed which has a higher pressure than the medium flowing through the valve. This higher pressure of the control gas must not fall below a definite minimal value if the valve is to open positively. This minimal pressure is easily determined from the data at hand, as the pressure of the medium flowing through the valve, weight of the valve diaphragm and valve spindle, inner cylinder and piston friction, spring constants and diameter of the piston. In reverse the valve can be easily adjusted to a given control gas with a stable minimal pressure when a suitable spring and a sufficiently large piston diameter are chosen.

A bolt 17 projects into a nut on the valve spindle 7 and secures it against turning. A bore 19 serves to exhaust the space beneath the piston 4.

The check valve in FIG. 2 corresponds in large measure to that in FIG. 1. In this embodiment the valve diaphragm 3 is on the same side as the valve seat 2, as the piston 4, and the spring 16; that is, in the space between the valve seat 2 and the valve cover 6.

With this arrangement the valve is closed when not being driven; the spring 16 must be arranged differently from that of FIG. 1; that is, it must be between piston 4 and valve cover 6. The spring 16 then is inserted in a recess in piston 4. There are of course, numerous other constructions possible with the spirit of this invention. With the embodiment of FIG. 2 the impact on piston 4 and cylinder 5 by the controlling gas follows at a lower pressure than that of the medium flowing through the valve. Here also there is a definite limiting value for the pressure of the controlling gas, entirely analagous to the situation in the description of FIG. 1.

IN FIG. 3 there is a special form illustrated for a check valve which in large measure resembles that described under FIG. 2 in which, however, the spring 16 is arranged, as in the embodiment of FIG. 1, concentrically on the valve spindle 7 between piston 4 and the base of the valve spindle 8. As a result this valve is open when not being acted upon by the controlling gas.

FIG. 4 shows a combination of check valves according to the invention at the cold end of a reversible plate heat exchanger or regenerator of an air reduction installation.

As schematically shown therein, two passages of the plate heat exchanger or regenerator are designated as 20 and 21. Cold nitrogen at low pressure fills passage 20 and passes into the exchanger via the pipe 22 there to release its cold air, or in other words to absorb heat. In passage 21 there is still air under high pressure which is to be cooled in the exchanger and flow into the reduction apparatus through pipe 23. By means of a connection device (not illustrated) the passages 20 and 21 are exchanged from time to time. In relation to this action four valves are provided, two nitrogen valves 24 and 26 and two air valves 25 and 27. The nitrogen valves 24 and 26 correspond to the valve illustrated in FIG. 1, and the air valves 25 and 27 to the one described in FIG. 2. The valves 24 and 25 are connected with the nitrogen passage 20 by short pieces of pipe 28 and 29, the valves 26 and 27 through corresponding pieces of pipe 30 and 31 with the air passage 21. The air valves 25 and 27 open through pipes 33 and 35 into the pipe 23; the nitrogen valves are connected through pipes 32 and 34 with pipe 22. Further, the control openings of valves 24 and 25 are connected by the control pipe 39 with the air passage 21. Correspondingly the control openings o valve 26 and 27 are connected through a control pipe 36 with the nitrogen passage 20. The direction of flow of nitrogen is indicated by arrow 37, that of the air by arrow 39.

In the type of connection illustrated in FIG. 4 the nitrogen valve 24 and the air valve 27 are open, and the other two valves are closed. The cylinders of valves 24 and 25 of the nitrogen passage 20 are struck by the high pressure of the air in the air passage 21 through the control pipe 35. The cylinders 26, 27 of the air passage 21, connected through the control pipe 36 are struck by the lower pressure of nitrogen in the nitrogen passage 20.

The piston of the air valve 25 is struck from above and below by air and is therefore non-functional. The valve 25 becomes closed through the pressure of the spring and the pressure of the air on the valve diaphragm.

The piston of the nitrogen valve 24 is struck from above by air and from below by nitrogen; it is pushed down against the pressure of the spring and the valve 24 opens. The opening of the e valve 24 is supported by the pressure of the flowing nitrogen; however, this support is not necessary. Even when the volume flow of nitrogen is very small, the maximal cross-sectional area of the valve is opened.

The piston of the air valve 27 is struck by nitrogen from above and from below by air; therefore there is a relatively lower pressure in the cylinder and the piston is pushed upward against the pressure of the spring, so that valve 27 is opened. The opening of valve 27 is supported by the pressure of the flowing air. This support is, however, not required, as with a smaller volume flow of air the entire cross-sectional area of the valve is opened.

The piston of the nitrogen valve 26 is closed by means of the pressure of the spring and the force of the air on the valve diaphragm.

It is obvious that by the switching of the passages, the function of valves 24 and 27 is exchanged with the function of valves 25 and 26; the maximal opening of the valves always occurs. The valve diaphragm can be controlled in a purely mechanical manner as the valve spindle might be extended to the exterior through valve cover instead of control by the piston and the associated piping. Aside from a more complicated construction, such a solution would be disadvantageous on account of the greater loss of cold through heat conduction over the valve spindle.

The installation of the check valves made according to this invention at the cold end of reversible plate heat exchangers or regenerators is especially advantageous, above all, when the flowing media are under different high pressures which can be used directly for control of the valves. The invention is, however, in no way limited to this particular use, as check valves made according to this invention can be constructed in most varied forms. The valves are simple in construction and their function can be altered by the exchange of only a few simple parts. They are very nearly free of wear and tear and need no special care. They always open to the total cross-sectional area.

What is claimed is:

1. A check valve comprising a housing, an inlet and an outlet in said housing, a valve housing cover on said housing, a valve seat in said housing between said inlet and said outlet, a spring loaded diaphragm positioned for moving toward and away from said valve seat for controlling flow therethrough, said diaphragm being mounted on one end of a valve spindle, the other end of said spindle being constructed as a piston and being movable in a valve spindle cover, said spindle cover forming with said housing cover a cylinder for said piston, and an opening in said housing cover disposed in line with said piston whereby a blast of control gas may enter through said opening into said cylinder and against said piston to cause said piston to move in a forward stroke for actuating said diaphragm, in combination therewith, a plurality of said check valves, a reversible plate heat exchanger or regenerator system having means for inflowing medium and for outflowing medium, said check valves being on the cold end of said system, a chamber for the inflowing medium and a chamber for the outflowing medium, each of said chambers having an inlet and an outlet, one of said check valves being disposed in each of said inlets and said outlets, said inlet check valves being interconnected by a common supply pipe, said outlet check valves being interconnected by a common outflow pipe, the outflowing medium having a higher pressure than the inflowing medium, said inflowing medium check valves being connection for actuation control by the outflowing medium, and said outflowing medium check valves being connected for actuation control by the inflowing medium.

2. The arrangement of claim 1 wherein each of said inlet valves has its valve seat disposed between its diaphragm and its piston, its spindle having a base member disposed on the same side of the valve seat as the piston, and the spring for the diaphragm being concentrically mounted on its spindle and reacting between its base member and its piston.

3. The arrangement of claim 2 wherein each of said outlet valves has its diaphragm and spring and its piston all disposed between its valve seat and its housing cover, and the spring reacts between the piston and the housing cover.

4. The arrangement of claim 3 wherein the openings in said inflowing medium check valves are connected by a first control pipe to said outflowing medium chamber for actuating by the outflowing medium, and the openings in said outflowing medium check valves are connected by a second control pipe to said inflowing medium chamber for actuation by the outflowing medium, and the openings in said outflowing medium check valves are connected by a second control pipe to said inflowing medium chamber for actuation by the inflowing medium, said inflowing medium flowing through said check valves at said inlet of each of said chambers with said inlet check valves being openable by pressure, said outflowing medium flowing through said check valves at said outlet of each of said chambers with said outlet check valves being closable by pressure, said inflowing medium flowing through said second control pipe for respectively opening and closing the inlet and outlet valves of said outflowing medium chamber, and said outflowing medium flowing through said first control pipe for respectively opening and closing the inlet and outlet valves of said inflowing medium chamber.

\* \* \* \* \*